United States Patent
Siba et al.

(10) Patent No.: US 12,238,518 B2
(45) Date of Patent: Feb. 25, 2025

(54) METHOD FOR AUTHENTICATING A USER ON A NETWORK SLICE

(71) Applicant: THALES DIS FRANCE SAS, Meudon (FR)

(72) Inventors: Jan Siba, Austin, TX (US); Lionel Rozak-Draicchio, Austin, TX (US); Vincent Dany, Aubagne (FR)

(73) Assignee: THALES DIS FRANCE SAS, Meudon (FR)

(*) Notice: Subject to any disclaimer, the term of this patent is extended or adjusted under 35 U.S.C. 154(b) by 205 days.

(21) Appl. No.: 17/777,319

(22) PCT Filed: Nov. 19, 2020

(86) PCT No.: PCT/EP2020/082609
§ 371 (c)(1),
(2) Date: May 17, 2022

(87) PCT Pub. No.: WO2021/099431
PCT Pub. Date: May 27, 2021

(65) Prior Publication Data
US 2022/0408252 A1 Dec. 22, 2022

(30) Foreign Application Priority Data
Nov. 21, 2019 (EP) .................... 19306496

(51) Int. Cl.
*H04W 12/06* (2021.01)
*H04L 9/40* (2022.01)

(52) U.S. Cl.
CPC ......... *H04W 12/06* (2013.01); *H04L 63/0853* (2013.01)

(58) Field of Classification Search
CPC ..................... H04W 12/06; H04L 63/0853
See application file for complete search history.

(56) References Cited

U.S. PATENT DOCUMENTS

| | | | |
|---|---|---|---|
| 11,223,947 B2 * | 1/2022 | Casati | H04W 8/20 |
| 2017/0164212 A1 | 6/2017 | Opsenica et al. | |
| 2017/0332212 A1 * | 11/2017 | Gage | H04W 36/26 |
| 2018/0176858 A1 * | 6/2018 | Wang | H04W 76/12 |
| 2018/0192471 A1 * | 7/2018 | Li | H04W 36/14 |
| 2018/0242198 A1 * | 8/2018 | Choi | H04L 67/51 |
| 2018/0310238 A1 * | 10/2018 | Opsenica | H04W 72/21 |
| 2018/0317086 A1 * | 11/2018 | Ben Henda | H04W 12/062 |
| 2019/0159029 A1 * | 5/2019 | Li | H04W 12/06 |
| 2019/0230584 A1 * | 7/2019 | Lou | H04W 48/16 |
| 2019/0261180 A1 * | 8/2019 | Lei | H04W 8/04 |

(Continued)

OTHER PUBLICATIONS

S. Behrad, E. Bertin, S. Tuffin and N. Crespi, "5G-SSAAC: Slice-specific Authentication and Access Control in 5G," 2019 IEEE Conference on Network Softwarization (NetSoft), Paris, France, 2019, pp. 281-285. (Year: 2019).*

(Continued)

*Primary Examiner* — Kari L Schmidt

(57) ABSTRACT

Provided is a method to operate a secure chip card for connecting to a user equipment operating in a cellular network comprising a plurality of network slices, wherein for at least one network slice a slice authentication server is operational, the secure chip card comprising a secured memory with at least one slice authentication application.

11 Claims, 2 Drawing Sheets

(56) References Cited

U.S. PATENT DOCUMENTS

| | | | | |
|---|---|---|---|---|
| 2019/0357136 | A1* | 11/2019 | Li | H04W 48/18 |
| 2020/0029264 | A1* | 1/2020 | Wang | H04W 36/13 |
| 2020/0053083 | A1* | 2/2020 | Kunz | H04L 69/329 |
| 2020/0112492 | A1* | 4/2020 | Chatras | H04W 48/18 |
| 2020/0120721 | A1* | 4/2020 | Lau | H04W 76/11 |
| 2020/0252798 | A1* | 8/2020 | Ito | H04W 88/12 |
| 2021/0243600 | A1* | 8/2021 | Yu | H04W 12/75 |
| 2022/0007277 | A1* | 1/2022 | Yu | H04W 60/00 |
| 2022/0110050 | A1* | 4/2022 | Won | H04W 8/12 |
| 2022/0124079 | A1* | 4/2022 | Patil | H04L 63/08 |
| 2022/0141192 | A1* | 5/2022 | Silveira | H04L 63/0823 726/15 |
| 2022/0377830 | A1* | 11/2022 | Mecum | H04W 48/16 |
| 2023/0096402 | A1* | 3/2023 | Kang | H04W 48/16 455/435.1 |
| 2024/0137748 | A1* | 4/2024 | Cai | H04W 36/13 |

OTHER PUBLICATIONS

C. -I. Fan, Y. -T. Shih, J. -J. Huang and W. -R. Chiu, "Cross-Network-Slice Authentication Scheme for the 5th Generation Mobile Communication System," in IEEE Transactions on Network and Service Management, vol. 18, No. 1, pp. 701-712, Mar. 2021. (Year: 2021).*

R. F. Olimid and G. Nencioni, "5G Network Slicing: A Security Overview," in IEEE Access, vol. 8, pp. 99999-100009, 2020. (Year: 2020).*

International Search Report (PCT/ISA/210) and Written Opinion (PCT/ISA/237) mailed on Dec. 3, 2020, by the European Patent Office as the International Searching Authority for current International Application No. PCT/EP2020/082609- [12 pages].

Telecomitalia et al: "Slice Specific Authentication and Authorization with multiple registrations in the samePLMN". 3GPP Draft; 23502_CR1224R5_ENS_(REL-16)_S2-1906592_WAS 5306 Multi-Access SSSA 23502, 3rd Generation Partnership Pro. ject (3GPP), Mobile Com. petence Centre • 650, Route Des Lucio les • F-06921 Sophia-Antipolis—vol. SAWG2, No. Reno, Nevada, United States—May 13, 2019-May 17, 2019 May 29, 2019 (May 29, 2019), XP051748976.

France Telecom/Oberthur Card Systems: "Clanfication for USIM Application selection", 3GPP Draft; SI-000326, 3rd Generation Partnership Project (3GPP), Mobile Competence Centre; 650, Route Des Lucioles ; F-06921 Sophia-Antipolis Cedex ; France vol. SA WGI, No. Beijing, China; Apr. 10, 2000-Apr. 14, 2000—Nov. 7, 2014 (Nov. 7, 2014), XP050890465.

Motorola Mobility et al: "Solution for network slice authentication and authorisation", 3GPP Draft; S2-188261 Ens Sol-Sliceauth V02, 3rd Generation Partnership Project (3GPP), Mobile Competence Centre; 650, Route Des Lucioles ; F-06921 Sophia-Antipolis Cedex ; France vol. SA WG2, No. Sophia Antipolis, France; Aug. 20, 2018-Aug. 24, 2018—Aug. 14, 2018 (Aug. 14, 2018), XP051537180.

Behrad Shanay et al: "5G-SSAAC: Slice-specific Authentication and Access Control in 5G", 2019 IEEE Conference on Network Softwarization (NETSOFT), IEEE, Jun. 24, 2019 (Jun. 24, 2019), pp. 281-285, XP033602035, DOI: 10.1109/NETSOFT.2019.8806667—abstract.

* cited by examiner

METHOD FOR AUTHENTICATING A USER ON A NETWORK SLICE

FIELD OF THE INVENTION

The present invention relates to a method for authentication a user on a network slice. The invention also pertains to a secured chip card using said method.

The invention further relates to a method for a slice authentication server. The invention further relates to a slice authentication server using said method.

BACKGROUND OF THE INVENTION

Generally, in the field of wireless communication it recently came up with the advent of the new technology standard of 5G (or New Radio, NR) the possibility that on the network side network slices are introduced. Network slices are virtually separated network areas, in particular dedicated for a certain service or device type. As 5G is also dedicated for enabling private networks, like company networks, this is another option for using such slices. Hence a network slice may be available for a company (or other organization) network.

By now, the authentication for accessing a cellular network is handled by the cellular network alone. It issues secured chip cards resp. smartcards, like UICCs, eSIMs, secure elements (SE) and the like which stores in a secured memory access credentials which are used in course of attaching the user equipment which is coupled with said secured chip card.

This has in the new context of company slices however the drawback that it still only authenticates user equipments, irrespective of who is using them. This is for an organization with certain security requirements simply not good enough.

Second, the organization might have the need to influence the authentication of user accessing the company slice, which is with the current legacy approach not possible, as here the network alone is handling all authentication matters.

It is therefore the goal of present invention to overcome the mentioned disadvantages and to propose a solution for an improved authentication of users for a certain network slice, in particular when governed by a separate authentication server.

Further alternative and advantageous solutions would, accordingly, be desirable in the art.

SUMMARY OF THE INVENTION

For this it is according to a first aspect of the invention suggested a method to operate a secure chip card according to claim 1. It is further suggested according to a second aspect of the invention a secure chip card according to claim 6. In a third aspect of the invention it is suggested a method for a slice authentication server according to claim 11.

According to the first aspect of the invention it is suggested a method to operate a secure chip card for connecting to a user equipment operating in a cellular network comprising a plurality of network slices, wherein for at least one network slice a slice authentication server is operational, the secure chip card comprising a secured memory with at least one slice authentication application, the method comprising the steps of:

retrieving a slice authentication configuration message comprising a slice identification from the user equipment, generating an application user identifier considering the slice identification, sending a slice attachment request comprising the application user identifier to the slice authentication server, receiving a user verification request from the slice authentication server, sending a user verification result to the slice authentication server, receiving a slice authentication success message.

The method relates to operating a secure chip card, which is an electronic authentication device comprising a secured memory, processing circuitry. The secure chip card is configured to be connected to a user equipment for operating in a cellular network. Such connection is either removable, like a pluggable SIM card, or permanently, like soldered.

Said user equipment has all transmitter and receiver circuitry for radio signal exchange with at least one base station of a cellular network. Typically it is foreseen to attach to a cellular network by camping on the base station. In a preferred embodiment it is proposed that the user equipment has registered to the cellular network by means of network access credentials stored in the secured chip card.

This is in particular happening through a defined set of authentication messages, in conjunction with the secure chip card the user equipment gets access to the cellular network, provided valid authentication data are stored on the secure chip card. This authentication mechanism is known under the term AKA.

The cellular network further comprises at least one network slice. Such network slices are virtually separated networks in the cellular network, wherein the network slice is preferably dedicated for a certain network service, device type, or a company network. The concept of network slices was introduced with the definition of 5G/New Radio (NR), along with mechanisms to select an appropriate network slice. As an example it is foreseen to define a network slice for remote provisioning of not yet provisioned user equipment (means without regular authentication data stored in a secure chip card). This illustrates how hermetically separated network slices are designed, as an unknown user equipment might get access to a specific network slice, without the risk of compromising the cellular network as a whole.

The at least one network slice is however supposed to be extra secured, in particular as a requirement of the entity that is using the network slice. E.g. for a company slice, access to the slice shall not only governed by the cellular network by way of the AKA mechanism. This mechanism only checks which device wants to access the network. Moreover there is the requirement to check what person actually wants to access the network slice, which is not possible with the existing authentication methods of cellular technology.

This is where the invention comes into play.

It proposes that for the at least one network slice at least one authentication server is operational. That slice authentication server has the task to govern access to the network slice, preferably independent of the authentication mechanism for registration on the base station of the cellular network. The access to the network slice is consequently managed by the inventive method, which starts with the method step of the secure chip card of retrieving a slice authentication configuration message. Such slice authentication configuration message comprises at least a slice identification. The message is retrieved from the user equipment, which got through, in course, or after the general AKA procedure hold of the slice identification.

The secure chip card comprises a slice authentication application, which is in particular a software module or executable, that has the task to authenticate to at least a specific network slice. In that sense the slice authentication application is assigned to that a least one specific network slice. In particular that slice authentication application is as part of the inventive method involved in generating an application user identifier.

For generation the application user identifier it is considers the slice identification. This is in particular the case by checking if the provided slice identification is identifying that at least one slice where the slice authentication application is assigned for. Should this not be the case the request would be rejected.

Additionally or alternatively the slice identifier is actually used for generating the application user identifier.

Consequently a slice attachment request is sent via the user equipment to the cellular network, in particular the AMF, for forwarding to the slice authentication server of the depicted network slice.

In response the secure chip card receives from the slice authentication server a user verification request. This is the request which is supposed to determine if an eligible user is using the user equipment with the secure chip card.

Consequently the secure chip card, preferably in conjunction with the user equipment acquires user verification information for preparing and sending a user verification result to the slice authentication server.

Preferably the user verification result is not yet the decision if the user is eligible, but a direct or preprocessed data set of the user verification entries.

In a preferred embodiment it is proposed that sending a user verification result comprises encrypting the user verification result before submitting.

With that it is assured that correct user verification results are submitted and cannot be detected or otherwise read and therefore compromised by attackers.

The term encryption in that sense encompasses further means of signing or otherwise securing the message, in order for the receiver to be assured that the user verification results received are the one that were sent, and were not spoofed somehow.

The slice authentication server then takes the decision if the user is eligible for accessing said network slice, and provides the result with the slice authentication message to the secure chip card.

If the result is positive, the user with the user equipment comprising said secure card then has access to the network slice.

This method is advantageously as it is transparent toward the cellular network, and does not require additional changes in the general access method for the cellular network.

Moreover the kind of user verification is only driven by the slice authentication server and therefore not limited to certain verification methods, like a PIN. In a preferred embodiment it is proposed a method wherein the secure chip card is configured to store a plurality of slice authentication applications, further comprising a slice authentication proxy application, wherein the first of the plurality of slice authentication applications is assigned to a first slice of the cellular network, and a second slice of the plurality of slice authentication applications is assigned to a second slice of the cellular network, the method comprising the step after receiving of the user verification request dispatching the user verification request to one of the plurality of slice authentication applications.

According to this embodiment the secure chip card additionally provides a slice authentication proxy application, plus a plurality of slice authentication applications.

The slice authentication applications, or at least one of them, are assigned to a different network slice of the cellular network, than at least one second slice authentication applications.

In fact there may additionally be slice authentication applications being assigned to the same network slice.

Hence, after receiving the user verification request, the slice authentication proxy application is foreseen to dispatch the request to the correct slice authentication application which is assigned to the network slice, from which authentication sever the user verification request was submitted.

Moreover it is advantageous to carry out the generation of the application user identifier by means of the slice authentication application which was preferably addressed by the slice authentication proxy application as well.

This embodiment is advantageous as it enhances the inventive method by allowing a user equipment with a respective secure chip card to access a plurality of network slices. Each network slice might have different access regulations, and they do not influence each other.

According to another preferred embodiment it is further proposed that the method comprising the steps for the secure chip card of
receiving from the slice authentication server a set of application configuration parameter,
updating the stored at least one slice authentication application based on the received set of application configuration parameter.

With this embodiment the slice authentication server of a network slice is put into the position to remotely configure the at least one slice authentication application stored in the secure chip card. For that it receives a set of application configuration parameter.

Such application configuration parameter might comprise a change of the behavior by parametrizing the slice authentication differently than before. In particular such application configuration parameter might comprise cryptographic keys or signatures, certificates for continuing operation as described. Additionally memory management/buffer size configuration or the usage of a certain algorithm for computation e.g. of the application user identifier might be part of the configuration parameter.

Alternatively such application configuration parameter might comprise functional updates of the slice authentication application stored on the secure chip card.

Additionally loading of a complete new slice authentication application or an update of the slice authentication proxy application or is encompassed by the application configuration parameter of this embodiment of the invention. For that of course the secure chip card needs to be preconfigured, that updating, in particular incremental updating is possible. This in particular requires sufficient storage, preferably in the secure chip card.

Alternatively storage means of the user equipment might be used for doing so. Additionally it has to be considered that the updating procedure maintains the security of the secure chip card. Therefore it is advantageous to make use of secured updating mechanisms available with the secure chip card.

In a second aspect of the invention it is proposed a secure chip card for connecting to a user equipment operating in a cellular network comprising a plurality of network slices, wherein for at least one network slice an slice authentication server is operational, the secure chip card comprising a secured memory with at least one slice authentication application, wherein the secure chip card is configured to:
- retrieve a slice authentication configuration message comprising a slice identification from the user equipment,
- generate an application user identifier considering the slice identification,
- send a slice attachment request comprising the application user identifier to the slice authentication server,
- receive a user verification request from the slice authentication server,
- send a user verification result to the slice authentication server,
- receive a slice authentication success message.

The second aspect of the invention relates to a secure chip card for connecting to a user equipment. It typically comprises a secure memory, processing circuitry. Example of a secure chip card are universal integrated circuit cards (UICC), which usually has a tamper-resistant security system, like a secure file system etc., or other smart cards.

It has connection means for connecting to a user equipment. Such connection means may be permanent, e.g. through soldering, or removable, like a SIM card.

Further form factors are encompassed like a eUICC, being part of another processor, which is in particular part of the user equipment.

The second aspect of the invention shares the advantages of the first aspect of the invention.

According to the third aspect of the invention it is proposed a method for a slice authentication server being assigned to a network slice of a cellular network, the method comprising the step of
- receiving from a secure chip card of a user equipment a slice attachment request comprising an application user identifier,
- sending a user verification request to the secure chip card,
- receiving a user verification result,
- evaluating the user verification result,
- sending a slice authentication success message to the secure chip card.

The third aspect of the invention relates to a method for a slice authentication server. This is assigned to at least one specific network slice of a cellular network. Typically it will be part of the cellular network, alternatively part of a company network, with access to the network slice.

According to this aspect of the invention the slice authentication server receives from a secure chip card according to the second aspect of the invention. That secure chip card is connected to a user equipment a slice attachment request comprising an application user identifier. This is happening through the radio signalling means of the user equipment and through the serving base station and network components like AMF etc.

The application user identifier is created in the secure chip card. In particular it is generated by considering the slice identification, at least for selecting the appropriate slice authentication application for that slice identification. For starting the user verification process in response to receiving the application user identifier, the slice authentication server sends a user verification request to the secure chip card.

Such user verification request instructs the secure chip card, in particular in conjunction with the user equipment, to request a set of user credentials, and to return them as a user verification result.

With the user verification result the slice authentication server can, in particular based on stored user authentication data, evaluate of the received user credentials are reliable and fit to stored user authentication data of access eligible data.

Consequently the result of the evaluation step is sent with a slice authentication message to the secure chip card, in order to inform if the user may access the network slice, and preferably to what extent.

According to the fourth aspect of the invention it is proposed a slice authentication server being assigned to a network slice of a cellular network, the slice authentication server being configured to:
- receive from a secure chip card of a user equipment a slice attachment request comprising an application user identifier,
- send a user verification request to the secure chip card,
- receive a user verification result,
- evaluate the user verification result,
- send a slice authentication success message to the secure chip card.

The slice authentication server according to the aspect of the invention in particular comprises or has access to a database with authentication records of access eligible entities like users and or user equipments. Preferably the slice authentication server is secured from unauthorized access, redundantly setup and therefore failure safe.

The fourth aspect of the invention shares the advantages of the third aspect of the invention.

As it is shown this invention advantageously solves the depicted problem and proposes a reliable solution for giving access to a network slice only for eligible users of a user equipment, independent from the network registration procedure.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a secure chip card 1 of the type to which the present invention is applied as an embodiment.

Figure 1:
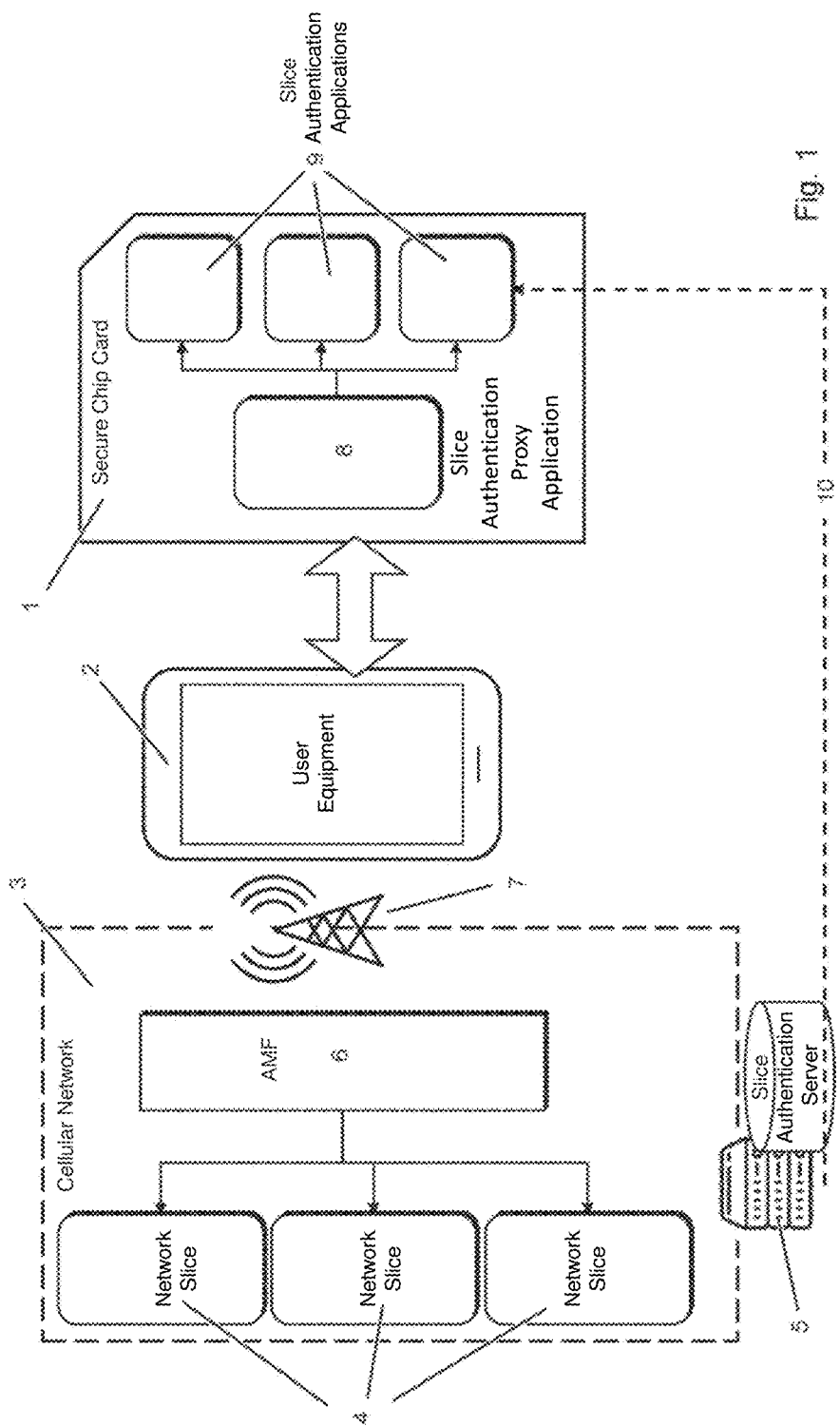
FIG. 1 represents a secure chip card of the type to which the present invention is applied as an embodiment.

The secure chip card 1 is connectively coupled to a user equipment 2, in this case a smartphone, but any other type of mobile device might be applied, including those in the field of Internet of things (IoT) resp. machine-to-machine (M2M) communication.

The user equipment 2 in conjunction with the secure chip card 1, in particular a UICC, is operating in a cellular network 3. This is happening by means of at least one base station 7, and the cellular network components like Access and Mobility Management Function (AMF, 6).

The cellular network 3 comprises a plurality of network slices 4. Such network slices 4 are virtually separated areas, like subnetworks, which are dedicated to a certain service, device type or company network.

For some of these network slices 4 it is foreseen that a slice authentication server 5 is governing access to one or more network slices. This is a typical use case for company networks.

The slice authentication server 5 typically has access to a database where records for eligible users are preferably stored (this part is called hereinafter user database).

The slice authentication server 5 as shown is dedicated to give access to users rather than user equipments. For user equipments 2 the cellular network maintains the access authentication, typically by means of access credentials stored on the secure chip card resp. UICC 1.

However, for some network slices, or in particular company networks related slices, it is important to only give access to certain users.

For that the inventive method is applied. For that the secure chip card 1 additionally comprises a slice authentication application. This is in the shown embodiment a software module which governs the access of a user to the network slice.

Preferably the slice authentication application 9 might be reconfigurable, by a special access between the slice authentication server 5 (via the cellular network and the user equipment of course), which is represented through configuration parameter update channel 10. Such configuration parameter might be certain parameter relating to users, types of user verification, but also software updates for the slice authentication application 9. The communication might happen based on a polling from the secure chip card, or as initiative request from the slice authentication server 5.

In the shown case the secure chip card 1 is designed to facilitate access to more than one network slice 4. For that purpose the secure chip card 1 comprises a plurality of slice authentication applications 9, in this case one for each network slice.

For co-ordinating access to the slice authentication applications 9 per network slice 4 the secure chip card further comprises a slice authentication proxy application 8. This a software module within the secure chip card, which is dedicated to dispatch access requests to the slice authentication applications 9, as part of the inventive method.

Figure 2:
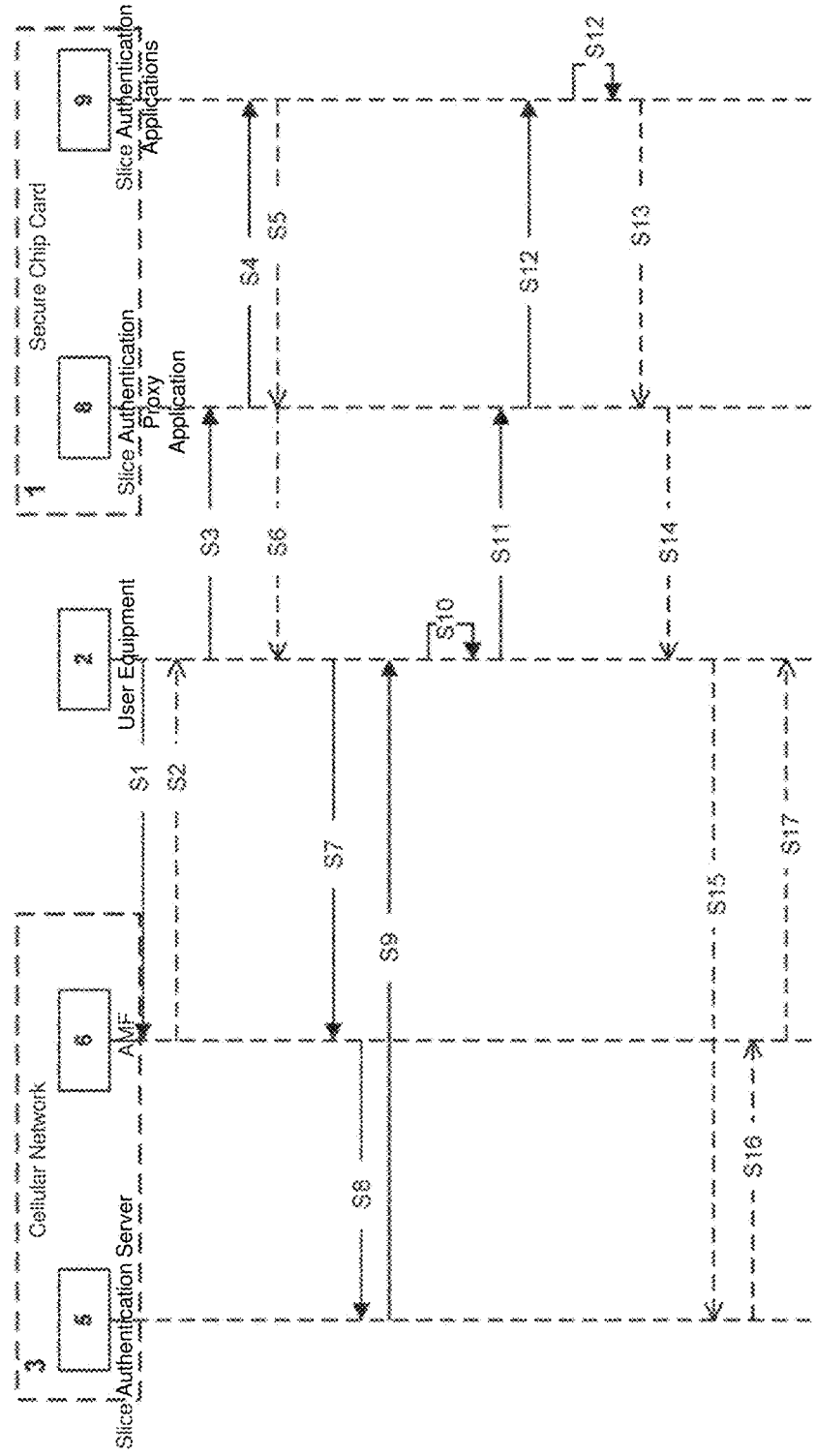
FIG. 2 shows a sequence diagram of an exemplifying embodiment of the invention.

An exemplifying embodiment of the inventive method is shown in FIG. 2. Some of the components shown in FIG. 1 are here exchanging messages as part of the exemplifying embodiment of the inventive method.

It is assumed that the user equipment 2 has successfully registered within the cellular network 3, by means of access credentials available in the secure chip card 3. The user equipment 1 is consequently camping on a base station 7 of the cellular network.

When this has happened, the user equipment might start the network slice access procedure with message S1, where it is requested for the available services resp. slices. In response a list of available network slice IDs is submitted with message S2. This is typically done through the Single Network Slice Selection Assistance Information (S-NSSAI) as defined in the 5G standard.

The user equipment, in particular with a help of a user interaction for selecting a specific network slice, picks the slice ID of the specific network slice and sends a slice authentication configuration message S3, in this example enriched with the slice ID to the secure chip card. For that purpose it is made use of a call interface between user equipment and secure chip card.

The slice authentication configuration message in particular comprises the slice ID.

With the slice ID, the retrieving slice authentication proxy application 8 of the secure chip card 1 checks if a slice authentication application dedicated for that slice ID is available. If so, the slice authentication proxy application 8 sends the request S4 to the slice authentication application 9 dedicated for the slice which is identified through the slice ID.

At the slice authentication application 9 an application user identifier is generated, in particular considering the slice identification. This application user identifier is an identifier which is designed to represent the user who wants to get access to the network slice.

The application user identifier is in particular concealed, meaning it may change each time it is requested. Preferably it comprises also checksums or other items to verify that it is correct. Personal data, in particular stored on the secure chip card resp. in the slice authentication application, are preferably used for creating the application user identifier.

With response messages S5 and S6 the application user identifier is provided to the user equipment 2. The user equipment then can start with a slice attachment request S7, comprising the slice ID and the application user identifier. With this message the user equipment request from the network slice, or to be exact: the slice authentication server 5. Hence it is forwarded from the AMF 6 with message S8 to the slice authentication server 5.

The slice authentication server 5 may check if for the authentication user identifier a stored record in the locally accessible database is available. If this is the case, at the slice authentication server 5 it is then prepared a user verification procedure in order to find out, if the user—which according to the stored record has access to the slice—is really handling the user equipment 2.

Hence a user verification request S9 is sent from the slice authentication server 5 to the user equipment 2.

At the user equipment user verification data might be acquired (step S10), but that may also happen later. Such user verification data are in particular biometric data, a specific PIN or anything else reliably identifying the user. The user verification request is then handed over to the secure chip card 1, which, through the slice authentication proxy application 8 (message S11), forwards it to the slice authentication application 9 with message S12. Here it is carried out a user verification check in step S13, which might comprises an analysis of the retrieved user verification data.

Typically a decision if the user eligible for accessing the slice is however carried out at the slice authentication server 5. However preprocessing steps for collecting the user verification data to be send to the slice authentication server are determined at the slice authentication application 9.

Hence the user verification data are send with a user verification result message via messages S14, S15 and S16 to the slice authentication server. Preferably the user verification result is previously encrypted, in particular in step S13, and only the cryptogram is transmitted to the slice authentication server 5.

At the slice authentication server 5 it is then checked if the received (and decrypted) user verification result data represent an eligible user for accessing the network slice 4. This is in particular checked with the accessible user database at the slice authentication server 5.

The result of this check is sent with message S17 to the AMF and from there with message S18—if successful—the user equipment is informed that the requested slice attachment (message S7) is granted. If so, the user equipment 2 and in particular the user handling the user equipment has access to the depicted network slice 4.

When this is a company network slice, now the user has access to this slice.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to operate a secure chip card connected to a user equipment operating in a cellular network comprising a plurality of network slices, wherein for at least one network slice a slice authentication server is operational, the secure chip card comprising a secured memory with at least one slice authentication application,
   the method comprising the steps of:
      retrieving a slice authentication configuration message comprising a slice identification from the user equipment;
      generating, by a slice authentication application of said secure chip card, an application user identifier considering the slice identification, said application user identifier representing a user who wants to get access to the network slice via the user equipment,
      sending a slice attachment request comprising the application user identifier to the slice authentication server;
      receiving a user verification request corresponding to said application user identifier from the slice authentication server;
      acquiring user verification data acquired from the user of the user equipment,
      sending a user verification result to the slice authentication server; and
      receiving a slice authentication success message to the user equipment for the user of the user equipment to access to the slice corresponding to the slice identification.

2. The method according to claim 1, wherein the secure chip card is configured to store a plurality of slice authentication applications, further comprising a slice authentication proxy application,
   wherein the first of the plurality of slice authentication applications is assigned to a first slice of the cellular network, and a second slice of the plurality of slice authentication applications is assigned to a second slice of the cellular network,
   the method comprising the step after receiving of the user verification request dispatching the user verification request to one of the plurality of slice authentication applications.

3. The method according to claim 2, further comprising the steps for the secure chip card of
   receiving from the slice authentication server a set of application configuration parameter, and
   updating the stored at least one slice authentication application based on the received set of application configuration parameter.

4. The method according to claim 3, wherein the user equipment has registered to the cellular network by means of network access credentials stored in the secured chip card.

5. The method according to claim 4, wherein the step of sending a user verification result comprises encrypting the user verification result before submitting.

6. A secure chip card for connecting configured to be connected to a user equipment operating in a cellular network comprising a plurality of network slices, wherein for at least one network slice an slice authentication server is operational,
   the secure chip card comprising a secured memory with at least one slice authentication application; wherein the secure chip card is configured to:
      retrieve a slice authentication configuration message comprising a slice identification from the user equipment;
      generate an application user identifier, by a slice authentication application of said secure chip card, considering the slice identification, said application user identifier representing a user who wants to get access to the network slice;
      send, via the user equipment, a slice attachment request comprising the application user identifier to the slice authentication server;
      receive a user verification request corresponding to said application user identifier from the slice authentication server;
      retrieve user verification data acquired from the user of the user equipment;
      send a user verification result to the slice authentication server; and
      receive a slice authentication success message to the user equipment for the user of the user equipment to access to the slice corresponding to the slice identification.

7. The secure chip card according to claim 6, further configured to store a plurality of slice authentication applications, further comprising a slice authentication proxy application,
   wherein the first of the plurality of slice authentication applications is assigned to a first slice of the cellular network, and a second slice of the plurality of slice authentication applications is assigned to a second slice of the cellular network,
   the secure chip card being configured after receiving of the user verification request to dispatch the user verification request to one of the plurality of slice authentication applications.

8. The secure chip card according to claim 6, further being configured to:
   receive from the slice authentication server a set of application configuration parameter, and
   update the stored at least one slice authentication application based on the received set of application configuration parameter.

9. The secure chip card according to claim 8, wherein the user equipment has registered to the cellular network by means of network access credentials stored in the secured chip card.

10. The secure chip card according to claim 9, further configured upon sending a user verification result to encrypt the user verification result before submitting.

11. A method for a slice authentication server being assigned to a network slice of a cellular network, the method comprising the step of:

receiving, at the slice authentication server, from a secure chip card of a user equipment a slice attachment request comprising an application user identifier generated from a slice identification representing a user who wants to get access to the network slice via the user equipment, checking, by the slice authentication server, for the application user identifier, a stored record is available, preparing, by the slice authentication server, a user verification request, wherein the user verification request instructs the secure chip card, in conjunction with the user equipment, to return a user verification request, sending, by the slice authentication server, the user verification request to the secure chip card, receiving, at the slice authentication server, a user verification result, evaluating, by the slice authentication server, the user verification result, and sending, by the slice authentication server, a slice authentication success message to the user equipment to access to the slice corresponding to the slice identification.

* * * * *